US012800156B2

(12) United States Patent
Evans, Jr. et al.

(10) Patent No.: US 12,800,156 B2
(45) Date of Patent: Nov. 17, 2026

(54) RESIDENTIAL HYDRONIC MAGNETIC, SEDIMENT, AND AIR SEPARATION DEVICE WITH MAINTENANCE INDICATOR

(71) Applicant: FLUID HANDLING LLC, Morton Grove, IL (US)

(72) Inventors: Stanley Paul Evans, Jr., Tinley Park, IL (US); Barry Lee, Elmhurst, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 0 days.

(21) Appl. No.: 18/879,511

(22) PCT Filed: Jun. 28, 2023

(86) PCT No.: PCT/US2023/026397
§ 371 (c)(1),
(2) Date: Dec. 27, 2024

(87) PCT Pub. No.: WO2024/006318
PCT Pub. Date: Jan. 4, 2024

(65) Prior Publication Data

US 2025/0256223 A1 Aug. 14, 2025

Related U.S. Application Data

(60) Provisional application No. 63/357,776, filed on Jul. 1, 2022.

(51) Int. Cl.
*F24D 19/00* (2006.01)
*B01D 19/00* (2006.01)
(Continued)

(52) U.S. Cl.
CPC ..... *F24D 19/0092* (2013.01); *B01D 19/0042* (2013.01); *B01D 21/0009* (2013.01);
(Continued)

(58) Field of Classification Search
CPC ............ F24D 19/0092; B01D 19/0042; B01D 21/0009; B01D 21/245; B01D 21/2494;
(Continued)

(56) References Cited

U.S. PATENT DOCUMENTS 3,289,841 A * 12/1966 Quinting ................ B01D 35/15
55/420
4,238,326 A 12/1980 Wolf
(Continued)

FOREIGN PATENT DOCUMENTS

| | | | |
|---|---|---|---|
| CA | 2945017 | A1 | 4/2018 |
| DE | 102011109164 | A1 | 2/2013 |

(Continued)

OTHER PUBLICATIONS

Efi Tsolaki and Evan Diamadopoulos, Technologies for ballast water treatment: a review, J Chem Technol Biotechnol 2010; 85: 19-32.

(Continued)

*Primary Examiner* — Liam Royce
(74) *Attorney, Agent, or Firm* — William J. Barber; WARE FRESSOLA MAGUIRE & BARBER LLP

(57) ABSTRACT

A separation device features a coalescing media and a magnetic separation insert. The coalescing media includes vertically assembled perforated sheets having surfaces with openings. The sheets form a coalescing media interior space in the separation chamber, and are configured and shaped to slow down hydronic fluid and enable entrained gasses, ferromagnetic or ferritic particles and other solids to coalesce and come out of a hydronic fluid via a coalescing action caused by the hydronic fluid contacting and flowing through the coalescing media. The magnetic separation insert is coupled to a bottom portion of the separation device and arranged in the coalescing media interior space and has
(Continued)

a non-magnetic sleeve that surrounds a removable magnet insert that generates a magnetic field to attract and collect the ferromagnetic or ferritic particles on the non-magnetic sleeve that coalesce and come out of the hydronic fluid, and can be removed from inside the non-magnetic sleeve to release the ferromagnetic or ferritic particles attracted and collected on the non-magnetic sleeve so released ferromagnetic or ferritic particles fall to the bottom portion of the separation chamber.

24 Claims, 6 Drawing Sheets

(51) Int. Cl.

| | |
|---|---|
| ***B01D 21/00*** | (2006.01) |
| ***B01D 21/24*** | (2006.01) |
| ***B01D 35/06*** | (2006.01) |
| ***B01D 36/00*** | (2006.01) |
| ***B03C 1/28*** | (2006.01) |
| ***B03C 1/30*** | (2006.01) |
| ***C02F 1/20*** | (2023.01) |
| ***C02F 1/48*** | (2023.01) |

(52) U.S. Cl.
CPC ....... *B01D 21/245* (2013.01); *B01D 21/2494* (2013.01); *B01D 35/06* (2013.01); *B01D 36/001* (2013.01); *B03C 1/286* (2013.01); *B03C 1/30* (2013.01); *C02F 1/20* (2013.01); *C02F 1/488* (2013.01); *B01D 2201/605* (2013.01); *B03C 2201/18* (2013.01)

(58) Field of Classification Search
CPC .. B01D 21/0006; B01D 35/06; B01D 36/001; B01D 2201/605; B03C 1/286; B03C 1/30; B03C 1/282; B03C 1/284; B03C 2201/18; B03C 2201/22; C02F 1/20; C02F 1/488
See application file for complete search history.

(56) References Cited

U.S. PATENT DOCUMENTS

| | | | | |
|---|---|---|---|---|
| 4,784,762 | A * | 11/1988 | Taliaferro | G01V 3/08 210/85 |
| 4,874,507 | A | 10/1989 | Whitlock | |
| 5,460,718 | A | 10/1995 | Weck et al. | |
| 5,676,740 | A | 10/1997 | Schwartz et al. | |
| 6,187,073 | B1 | 2/2001 | Gieseke et al. | |
| 6,260,830 | B1 | 7/2001 | Harrison et al. | |
| 7,290,450 | B2 | 11/2007 | Brown et al. | |
| 7,494,587 | B2 | 2/2009 | Yan et al. | |
| 8,041,462 | B2 | 10/2011 | Milder et al. | |
| 8,177,975 | B2 | 5/2012 | Schipper | |
| 9,168,475 | B2 | 10/2015 | Dorao et al. | |
| 9,352,331 | B1 | 5/2016 | Lee et al. | |
| 9,671,125 | B2 | 6/2017 | Mowris et al. | |
| 10,029,264 | B2 | 7/2018 | Adey et al. | |
| 10,092,912 | B2 | 10/2018 | Adey et al. | |
| 10,500,595 | B2 | 12/2019 | Olbermann | |
| 10,875,033 | B2 | 12/2020 | Janson et al. | |
| 11,378,938 | B2 | 7/2022 | Cella et al. | |
| 11,731,885 | B2 | 8/2023 | Turton et al. | |
| 2005/0017114 | A1 | 1/2005 | Gadini et al. | |
| 2013/0192286 | A1* | 8/2013 | Wang | C02F 1/38 62/238.7 |
| 2014/0367340 | A1 | 12/2014 | Caleffi | |
| 2018/0169544 | A1 | 6/2018 | Roddy et al. | |
| 2018/0236388 | A1* | 8/2018 | Harris | B01D 29/23 |
| 2019/0176068 | A1 | 6/2019 | Cogliati et al. | |
| 2020/0254462 | A1 | 8/2020 | Downie et al. | |
| 2020/0324299 | A1 | 10/2020 | Downie et al. | |
| 2021/0260509 | A1 | 8/2021 | Bertolotti et al. | |
| 2021/0276894 | A1* | 9/2021 | Bossini | B03C 1/286 |
| 2021/0292190 | A1 | 9/2021 | Turton et al. | |
| 2021/0322999 | A1 | 10/2021 | Yazdanbakhsh et al. | |
| 2022/0072453 | A1 | 3/2022 | Bossini | |
| 2022/0134259 | A1 | 5/2022 | Turton et al. | |
| 2022/0323968 | A1* | 10/2022 | Bruhn | B03C 1/286 |
| 2022/0355230 | A1* | 11/2022 | Mason | F24D 19/0092 |

FOREIGN PATENT DOCUMENTS

| | | | |
|---|---|---|---|
| DE | 202017104410 | U1 | 10/2018 |
| EP | 3159313 | A1 | 4/2017 |
| FR | 2710632 | A1 | 4/1995 |

OTHER PUBLICATIONS

M. Parker, Use of Superconducting Magnets in Magnetic Separation, Journal de Physique Colloques, 1984, 45 (C1), pp. C1-753-C1-758.

Taotao Zhu et al., Continuous separation of non-magnetic particles inside ferrofluids, Microfluid Nanofluid, Feb. 6, 2010, pp. 1-7.

Teoman Ariman, Morris S. Ojalvo & Dennis C. Drehmel (1979) Novel Concepts, Methods and Advanced Technology in Particulate/Gas Separation, Journal of the Air Pollution Control Association, 29:8, 818-822.

Tsochatzidis and Maroulis, Methods help remove black powder from gas pipelines, Oil & Gas Journal Mar. 12, 2007 volume 105, issue 10, pp. 1-9.

English Language Translation of FR2710632A1.

English Language Translation of DE102011109164A1.

English Language Translation of DE202017104410U1.

* cited by examiner

Typical Magnet and Spacer Arrangement for Insert

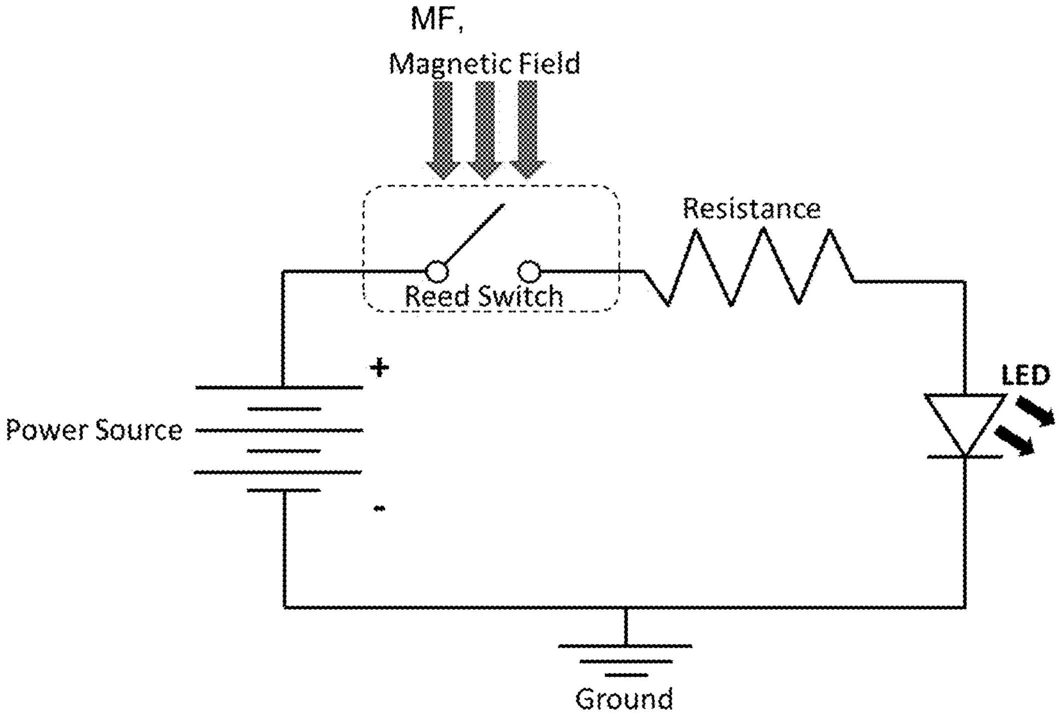
Figure 6: Reed Switch based Visual Maintenance Indicator
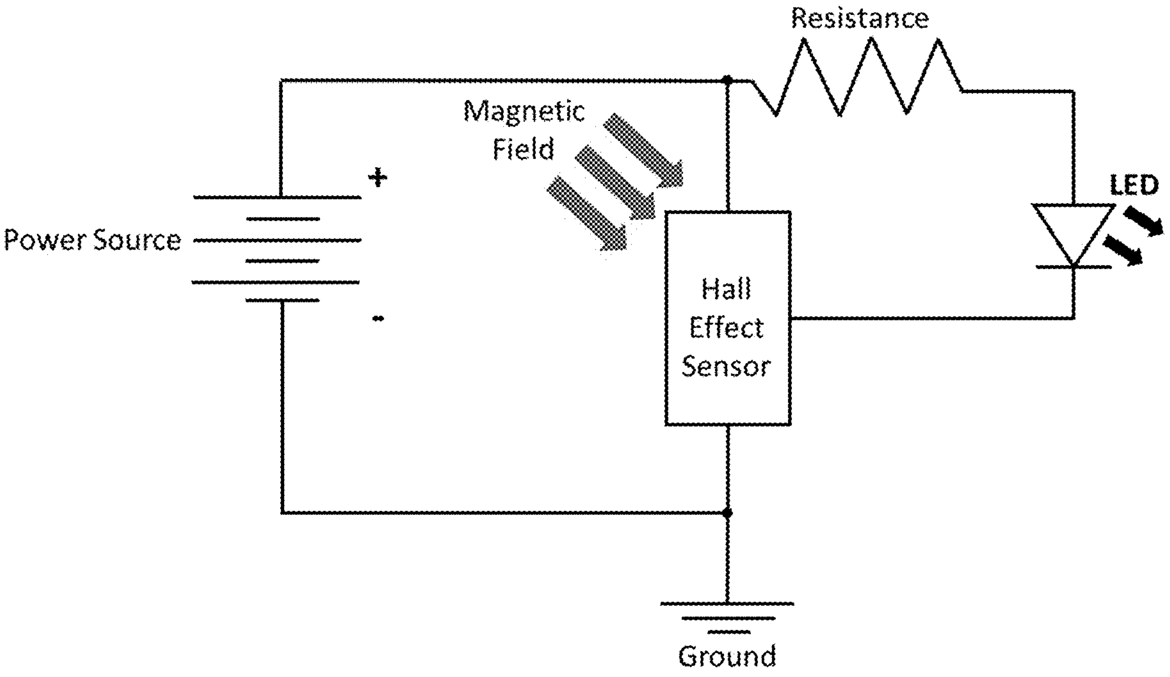
Figure 7: Hall Effect Sensor based Visual Maintenance Indicator Figure 9A
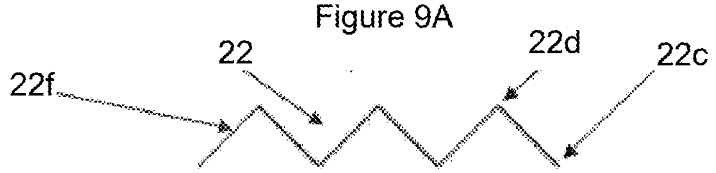
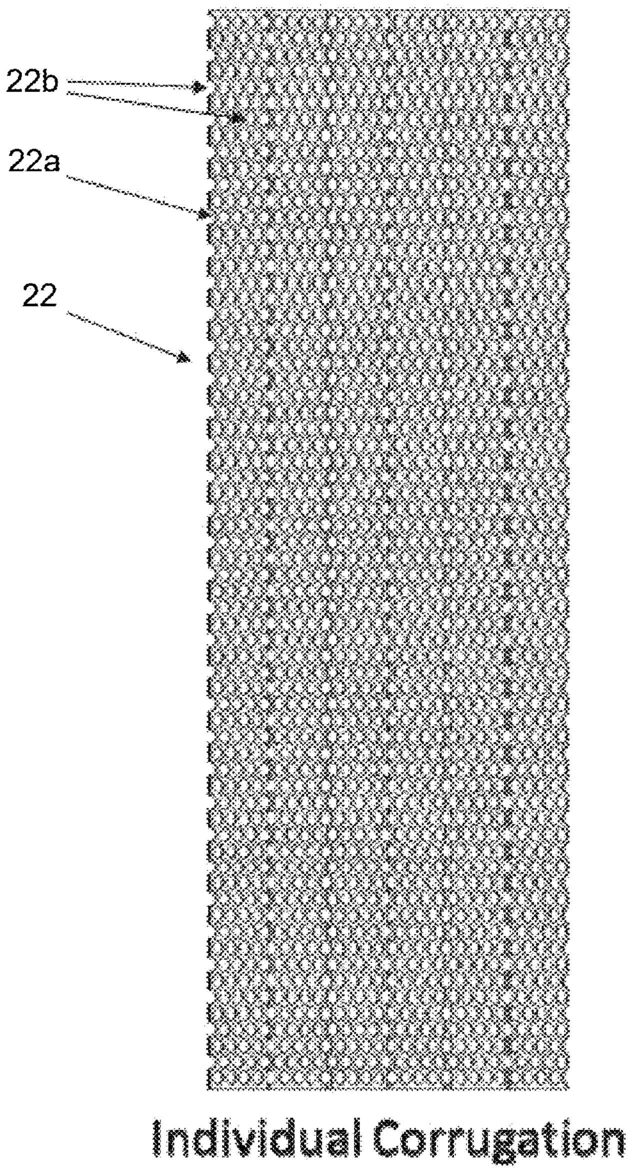
Individual Corrugation
Figure 9B

RESIDENTIAL HYDRONIC MAGNETIC, SEDIMENT, AND AIR SEPARATION DEVICE WITH MAINTENANCE INDICATOR

CROSS-REFERENCE TO RELATED APPLICATION

This application claims benefit to provisional patent application Ser. No. 63/357,776, filed 1 Jul. 2022, which is hereby incorporated by reference in its entirety.

BACKGROUND OF THE INVENTION

1. Field of the Invention

The present invention relates to a sediment and air separation device; and more particularly relates to a residential sediment and air separation device.

2. Brief Description of Related Art

Small coalescing removal separators are devices typically installed on residential hydronic HVAC systems to remove entrained gases (such as air) and solid particles (such as dirt and iron oxide) from the fluid flowing through the system. Gasses trapped in a hydronic system lead to potentially harmful corrosion. Solid particulates collect into sediment that can foul moving components in pumps or valves, damage sensors in the system, and clog heat exchangers and boilers, reducing system efficiency. Magnetic or ferrimagnetic particles can get trapped in pumps with electronically commutated motors, where magnets present will collect these particles that foul the moving components, reduce the pump's efficiency and potentially damage the pump.

Residential coalescing removal separators work by passing the HVAC system fluid into a chamber, through a coalescent media, and back out to the system. The action of passing the fluid through the coalescent media enables the entrained gasses and particles to be removed from the system. The coalescent media disrupts the fluid flow and slows the fluid velocity, which allows gas bubbles to come out of solution and, through their natural buoyancy, float to the top of the main separator chamber to be vented out of the system. Likewise, the reduction in fluid velocity allows solids in the fluid, which are heavier than the system fluid to come out of solution and drop to the bottom of the chamber to be later removed through a blow-down action. A blow down action involves opening a valve or drain at the bottom of a removal separator chamber to atmosphere, utilizing the difference between atmospheric pressure and the system pressure inside the chamber to force out the solid contaminants that have come out of solution as they passed through the coalescent media. The coalescent media also provides a surface for dissolved gasses and solids to collect, or coalesce, around. As more dissolved gas or solids pass through the coalescent media, the molecules will continue to coalesce until they are either buoyant enough to float to the top or heavy enough to drop to the bottom.

A magnetic separation option may be needed for the separator to effectively remove sediment that contains mostly black iron oxide, also known as magnetite, or other ferromagnetic particles that are suspended in the water.

Shortcomings of the Above Mentioned Known Devices

A number of problems with current residential hydronic separators exist. The coalescent media found in current residential separators can significantly increase the pressure drop of the unit, which can negatively impact the overall system efficiency. Another problem is that current residential separators may not effectively remove gasses or solids due to their designs. Current residential hydronic separators with a magnetic separation option offer their own unique sets of challenges. Most magnetic separation offerings do not do an effective enough job of removing magnetite or other ferromagnetic particles from hydronic system fluids. Residential separators with a magnetic separation option do not offer any visual indicator for the homeowner or regular maintenance person to know when the system needs to be serviced to remove any sediment or magnetite that had been collected in the separator.

SUMMARY OF THE INVENTION

The invention described here is a residential hydronic separator that improves the pressure drop characteristics across the separator while improving the ability of the device to more effectively remove gasses and solids, including ferromagnetic particles, from the system fluid.

This separator utilizes a coalescent medium consists of vertically assembled stainless steel perforated sheets, arranged such that they fill a large portion of the volume of the separator chamber. The sheets are assembled to each other to form a diamond shape. Alternately, the medium may be assembled from perforated corrugated stainless steel sheet, where the crests of the corrugation may be joined together to form the diamond shape described earlier. The coalescent medium may also be assembled from a single sheet where the ends are joined to form the diamond shape. The stainless steel perforated and/or corrugated sheets have an open area of 58% or greater, which facilitate the improved pressure drop characteristics. The open area of the diamond shape is conducive to the insertion of a magnetic insert inside a well assembly, which would be used to capture the magnetite or other ferromagnetic particles which may pass through the separator entrained in the system fluid.

The fluid flows into the separator through an inlet nozzle, into the separator chamber and through the coalescent sheet media, making contact with the face of the perforated stainless steel material to slow down the fluid velocity, enabling the entrained gasses and solids to come out of solution and either rise or sink, respectively, based on their buoyancy. The perforations of the coalescent sheet media provide multiple surfaces for dissolved gasses and solids to coalesce around.

The vertical diamond shape of the coalescent sheet media serves two purposes. First, the angled edges direct the fluid to pass through the coalescent sheet media where the greatest surface area contact could occur. Likewise, as the fluid has completed its pass through the coalescing sheet media, the reverse angled edges direct the fluid to the outlet, or discharge nozzle, to leave the separator, and allow the pressure drop to recover. These motions help reduce the overall pressure drop of the coalescing separator, compared to other different designs.

Second, the vertical alignment of the coalescent sheet media is rigid and resists the compressive forces that the coalescing sheet media would be subject to over the course of its operational lifetime. It is also resistant to any rotation.

The corrugated coalescing separator media is retained within the separator chamber by the chamber head at the top and a support ledge at the bottom of the chamber. This provides sufficient open area to permit gas bubbles to rise to the top of the separator and solids to fall to the bottom, while also providing ample space in the center for a magnetic separation insert.

The magnetic separation insert consisting of a non-magnetic sleeve, preferably stainless steel, which surrounds an alternating stack of magnets and carbon steel spacers. The magnets are arranged with like poles towards each other. This has the effect of increasing the size of the magnetic field generated by the magnets and also increasing the magnetic flux, or number of magnetic fields generated by the magnet arrangement. As system fluid passes through the separation chamber, entrained ferromagnetic particles, such as magnetite, become attracted to the magnetic field generated by the magnets in the insert and collect there. Likewise, any other ferritic solids (like iron oxide or pure iron or steel particles) that have come out of solution via coalescing action would be attracted to the magnetic fields produced by the insert. The ferromagnetic and ferritic particles that collect on the magnetic separation insert further increase the size of the magnetic fields involved and increases the collection capability. The stack of magnets and spacers can be removed from the inside of the magnetic separation insert, which will allow the ferromagnetic particles attached to the insert and to each other to fall to the bottom of the residential separator. Opening a blowdown valve at the bottom of the separator to drain it will allow the system fluid to flush out these particles, along with any other sediment or debris that was collected inside the separator chamber.

A visual indicator to notify the system operator that maintenance needs to be performed is accomplished through a sensor outside of the separator chamber. The sensor detects the magnetic flux, or increase in magnetic field activity, that increases as more ferromagnetic particles collect on the magnetic insert sleeve. The sensor, either a Hall Effect sensor, reed switch, or other type of magnetic flux sensing, detects the increased size of the magnetic field as the amount of ferromagnetic and ferritic particles that collect on the magnetic separation insert increases. When the sensor detects the desired threshold amount of magnetic field or flux, a light on the separator will either light up, begin to blink or change colors, indicating that maintenance is necessary on the separator or system. Upon magnet removal and system blowdown or flushing, the subsequent reduction in magnetic field will cause the light to turn off.

SPECIFIC EMBODIMENTS

According to some embodiments, the present invention may take the form of a separation device having a tank wall and top and bottom portions that combine to form a separation chamber for processing a hydronic fluid, and featuring a coalescing media and a magnetic separation insert.

The coalescing media includes vertically assembled perforated sheets having surfaces with a multiplicity of openings. The vertically assembled perforated sheets are configured to form a coalescing media interior space in the separation chamber, and also configured and shaped to slow down a hydronic fluid and enable entrained gasses, ferromagnetic or ferritic particles and other solids to coalesce and come out of the hydronic fluid via a coalescing action caused by the hydronic fluid contacting and flowing through the coalescing media.

The magnetic separation insert is coupled to the bottom portion of the separation device and arranged in the coalescing media interior space and has a non-magnetic sleeve that surrounds a removable magnet insert. The removable magnetic insert is configured to generate a magnetic field to attract and collect the ferromagnetic or ferritic particles on the non-magnetic sleeve that coalesce come out of the hydronic fluid, and also configured to be removed from inside the non-magnetic sleeve to release the ferromagnetic or ferritic particles attracted and collected on the non-magnetic sleeve so that released ferromagnetic or ferritic particles can fall to the bottom portion of the separation chamber.

The separation device may also include one or more of the following features:

The separation device may include a bottom coupling member configured on the bottom portion of the separation device; and the non-magnetic sleeve may include a sleeve coupling member configured to detachably couple to the bottom coupling member for coupling the magnetic separation insert to the bottom portion of the separation device.

The non-magnetic sleeve may include a non-magnetic surface configured to collected the ferromagnetic or ferritic particles attracted to the removable magnet insert by the magnetic field.

The removable magnet insert may include a handle having an insert coupling member; and the sleeve coupling member may be configured to receive the insert coupling member and couple the removable magnet insert to the non-magnetic sleeve when the removable magnet insert is inserted into the non-magnetic sleeve.

The removable magnet insert may include a rod connected to the handle; and an alternating stack of magnets and spacers configured to slide onto the rod and be retained by a bolt fastened to an end of the rod.

The alternating stack of magnets may include opposite magnetic poles arranged so that like magnetic poles face each other and are separated by a spacer.

The non-magnetic insert may be made of stainless steel; or the spacers are made of carbon steel; or the non-magnetic insert is made of stainless steel and the spacers are made of carbon steel.

The vertically assembled perforated sheets may be made from stainless steel.

The vertically assembled perforated sheets may have a vertical diamond shape with angled edges configured to direct the hydronic fluid to pass through the coalescing media and into the coalescing media interior space, and having reverse angled edges configured to direct the hydronic fluid to pass from the coalescing media interior space to an outlet or a discharge nozzle, leave the separation chamber and allow a pressure drop to recover.

The vertically assembled perforated sheets may be configured as corrugated sheets having peaks, crests and surfaces between the peaks and crests.

The vertically assembled perforated sheets may be formed and assembled either from a single sheet having two ends that join to form a diamond shape, or from multiple sheets having corresponding ends that join to form the diamond shape.

The coalescing media interior space may be an open space that is 58% or greater than the volume of the separator chamber in order to improve pressure drop characteristics of the separation device.

The separation device may include a maintenance indicator configured to respond to a magnetic flux generated by the magnetic separation insert and provide maintenance indicator signaling containing information about maintenance being needed on the separation device, including where the maintenance indicator signaling includes audio and/or visual signaling.

The maintenance indicator may be configured to respond to a reduced magnetic flux when the released ferromagnetic or ferritic particles are removed from the bottom portion of the separation chamber, and provide a corresponding maintenance indicator signaling that contains information that maintenance is not needed.

The maintenance indicator may include a circuit having a magnetic sensor configured to respond to the magnetic flux.

The magnetic sensor may include a Reed Switch or a Hall Effect sensor.

The circuit may include a light configured to provide visual maintenance indicator signaling, including where the light turns ON/OFF, blinks or changes color.

The magnetic sensor may be configured to respond to the magnetic flux that exceeds a desired magnetic flux threshold.

The desired magnetic threshold may depend and be based upon the amount of ferromagnetic or ferritic particles attracted and collected onto the non-magnetic sleeve.

The separation device may include a well assembly at the bottom portion of the separation chamber configured to collect the released ferromagnetic or ferritic particles.

The separation device may include a chamber head at the top portion and a support ledge at the bottom portion configured to retain the coalescing media in the separation chamber.

The separation device may include, or take the form of, a residential hydronic magnetic, sediment and air separation device that includes a separator tank having a separator input or inlet nozzle configured to receive the hydronic fluid, having a tank wall configured to form a volume/chamber inside the separator chamber to process the hydronic fluid, and having a separator output or discharge nozzle configured to provide processed hydronic fluid having at least some of the entrained gas, the ferromagnetic or ferritic particles and the other solid removed.

The separation device may include a blow down valve configured at the bottom portion of the separation chamber to open and drain the released ferromagnetic or ferritic particles collected in the well assembly.

The separation device may include an air vent configured at the top portion of the separation chamber to vent the entrained gasses that come out of the hydronic fluid.

The multiplicity of openings formed in the surfaces of the vertically assembled perforated sheets also coalesce the gasses and the other solids in the hydronic fluid.

BRIEF DESCRIPTION OF THE DRAWING

The drawing, which is not necessarily drawn to scale, includes the following Figures:

FIG. 6 is a diagram of a circuit having a Reed Switch based visual maintenance indicator, according to some embodiments of the present invention.

FIG. 7 is a diagram of a circuit having a Hall Effect based visual maintenance indicator, according to some embodiments of the present invention.

FIG. 9A is a side view of an individual corrugation that forms part of the coalescing media shown herein.

FIG. 9B is a top down view of the individual corrugation shown in FIG. 9A.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Figure 3:
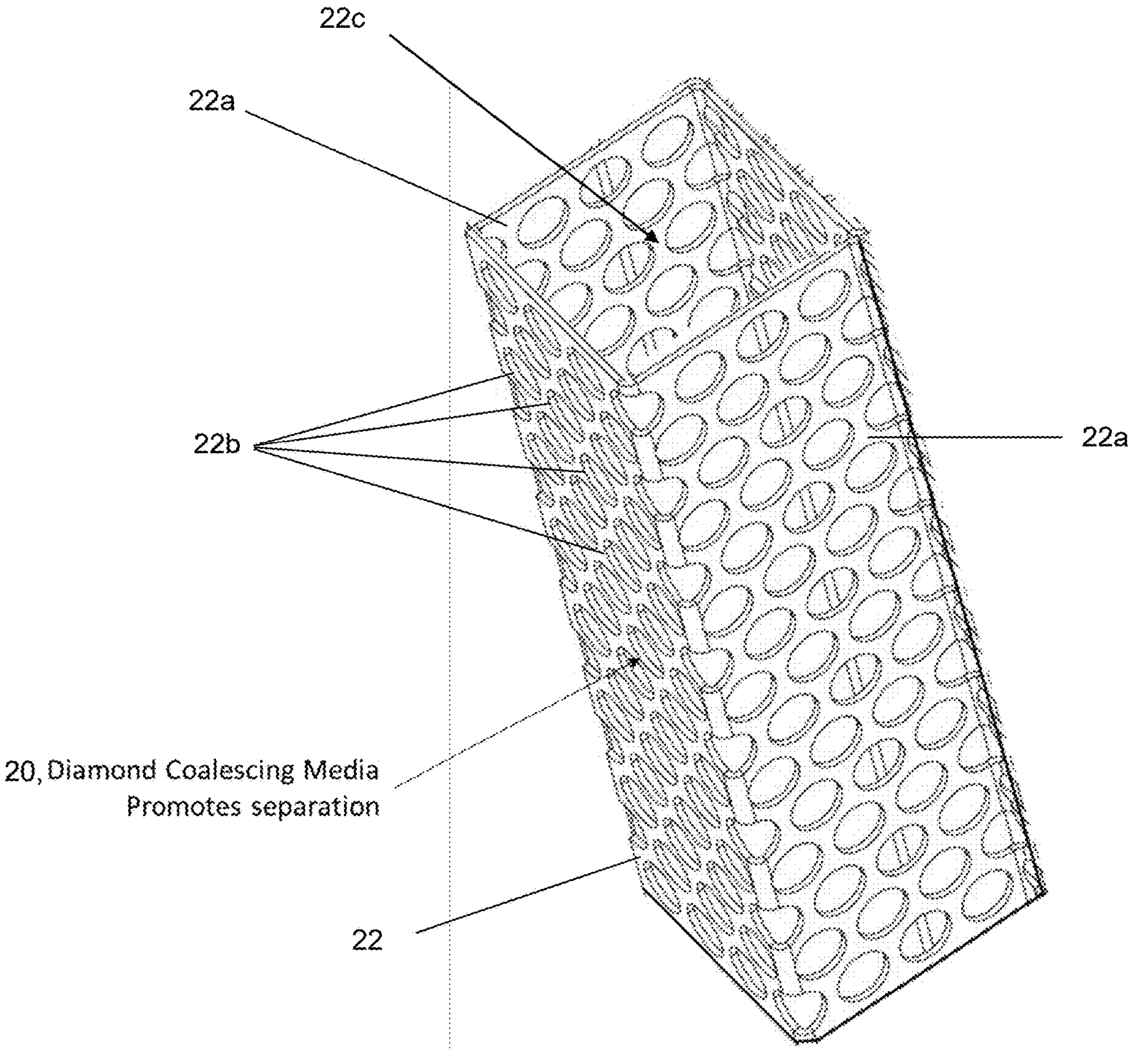
FIG. 3 is a perspective view of diamond coalescing media that forms part of the residential a top cross-sectional view of the hydronic air and sediment separation device shown in FIG. 1.
Figure 4:
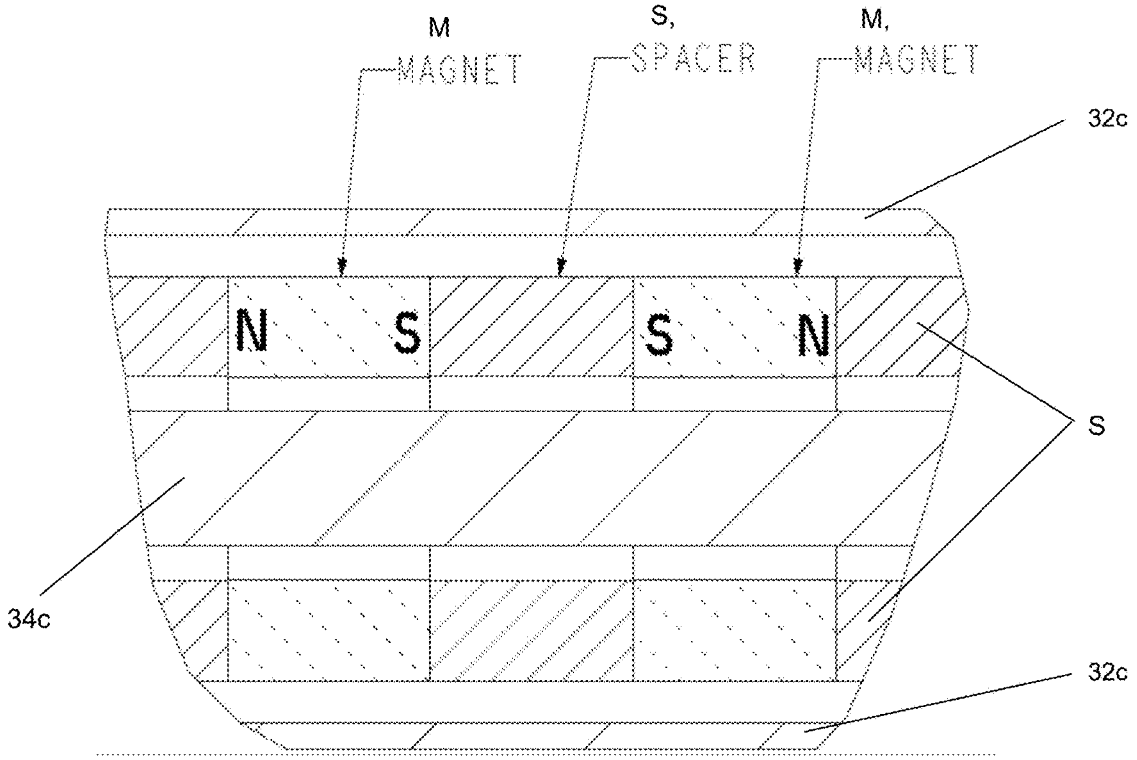
FIG. 4 is a diagram of a typical magnet and spacer arrangement for the removable magnet insert shown in FIG. 1, and according to some embodiments of the present invention.
Figure 5:
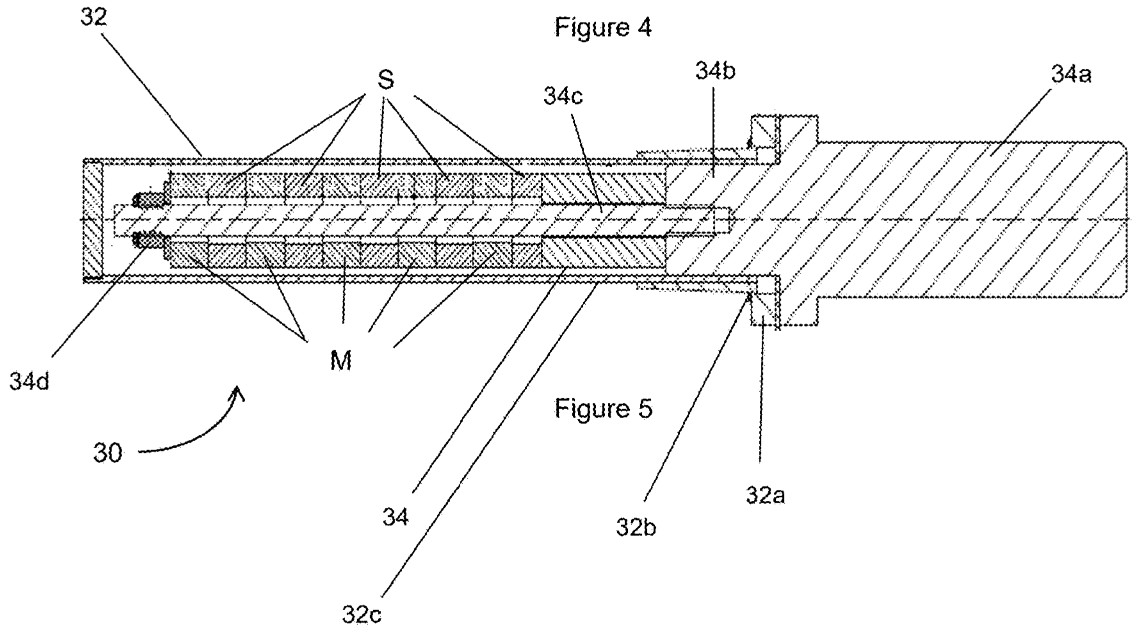
FIG. 5 is a cross-sectional view of the removable magnet insert shown in FIG. 1, according to some embodiments of the present invention.

According to some embodiments, and consistent with that shown in FIGS. 1-5 and 8, 9A and 9B, the present invention may take the form of a separation device generally indicated as 10 that has a tank wall 12, a top portion 14 and a bottom portion 16 that combine to form a separation chamber 18 (FIG. 2) for processing a hydronic fluid F, and that features a coalescing media 20 (FIGS. 3 and 9A-9B) and a magnetic separation insert 30 (FIG. 5). By way of example, the hydronic fluid F may include water entrained with gasses and particulate matter (e.g., including ferromagnetic or ferritic particles FP like magnetite or iron oxide).

Figure 2:
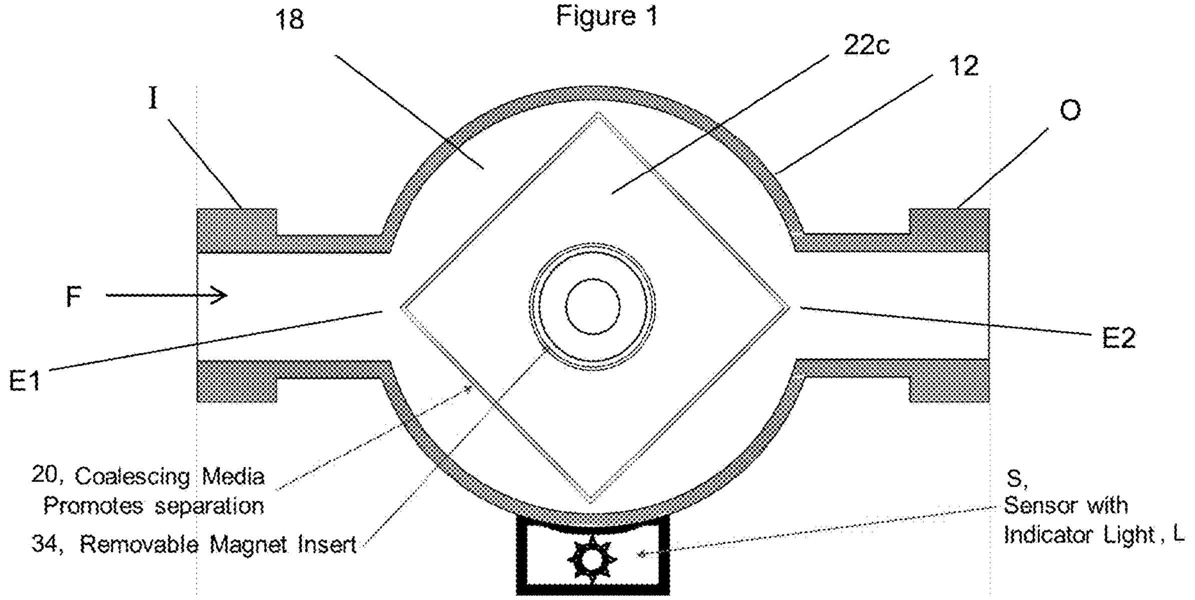
FIG. 2 is a diagram showing a top down cross-sectional view of the residential hydronic magnetic, sediment and air separation device having the coalescing media with the removable magnet insert arranged therein consistent with that shown in FIG. 1, and also showing a sensor with an indicator light, according to some embodiments of the present invention.

The coalescing media 20 includes vertically assembled perforated sheets 22 having surfaces 22*a* with a multiplicity of openings 22*b*, e.g., as shown in FIGS. 3, 9A and 9B. The vertically assembled perforated sheets 22 are configured to form a coalescing media interior space 22*c* (FIGS. 2 and 3) in the separation chamber 18, and also configured and shaped to slow down the hydronic fluid F and enable entrained gasses, ferromagnetic or ferritic particles FP and other solids to coalesce and come out of the hydronic fluid F via a coalescing action caused by the hydronic fluid F contacting and flowing through the coalescing media 20, e.g., including contacting the surfaces 22*a* and flowing through the openings 22*b*.

Figure 1:
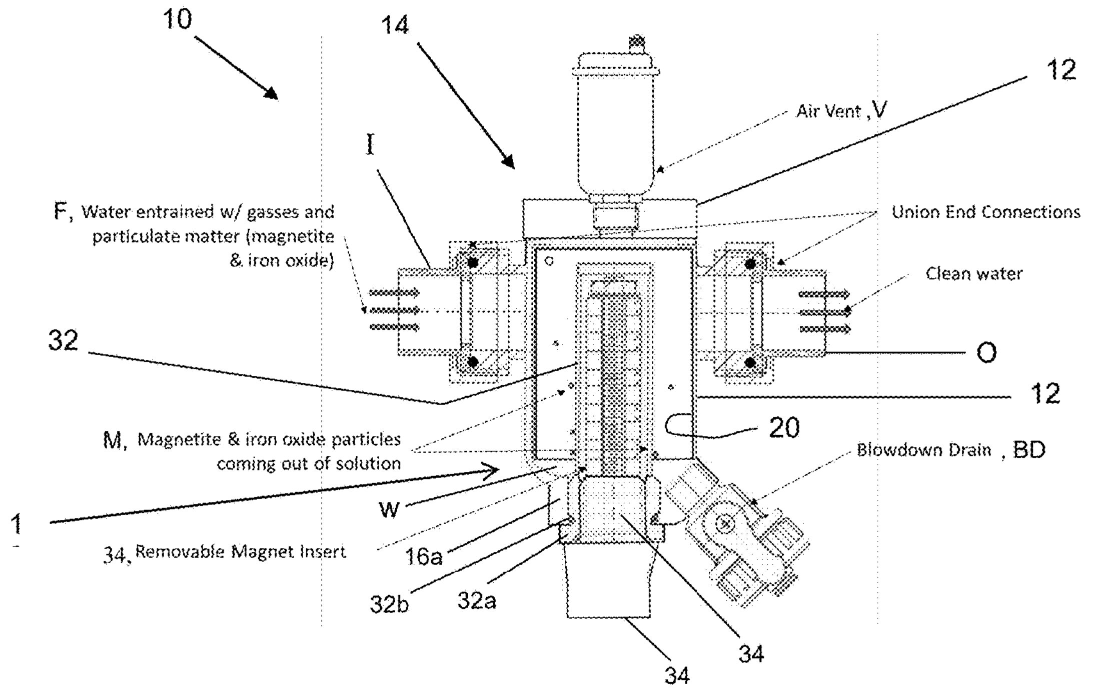
FIG. 1 is a side cross-sectional view of a residential hydronic magnetic, sediment and air separation device having coalescing media with a removable magnet insert arranged therein, according to some embodiments of the present invention.
Figure 8:
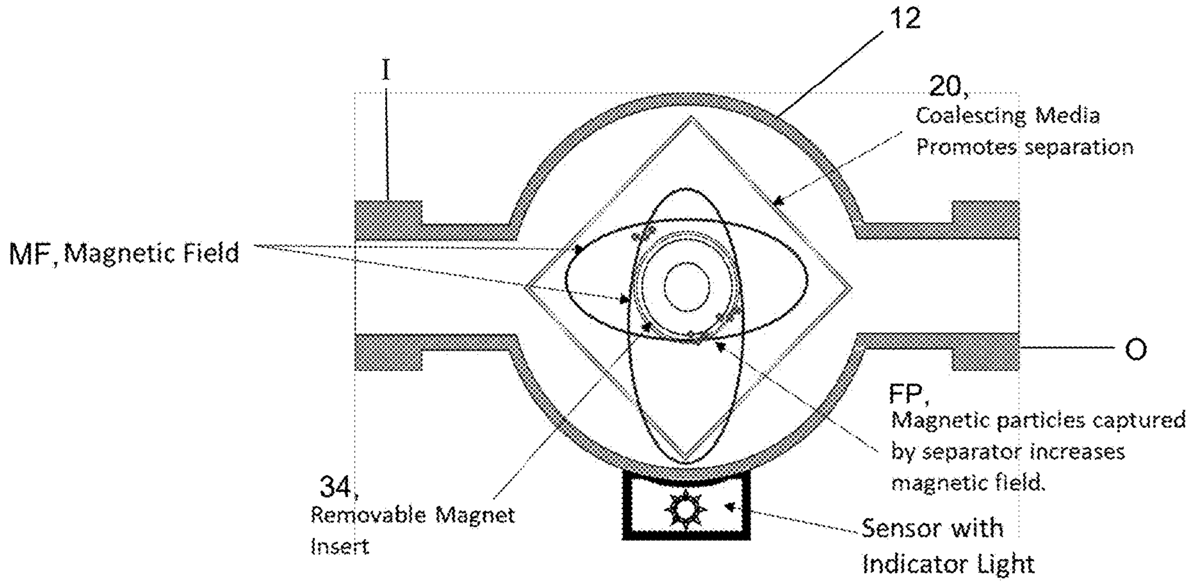
FIG. 8 is a diagram showing a top down cross-sectional view of the residential hydronic magnetic, sediment and air separation device shown in FIG. 2, and also showing a magnetic field and magnetic particle captured, according to some embodiments of the present invention.

The magnetic separation insert 30 is coupled to the bottom portion 16 of the separation device 10 and arranged in the coalescing media interior space 22*c* and has a non-magnetic sleeve 32 that surrounds a removable magnet insert 34, e.g., as shown in FIG. 1. The removable magnetic insert 34 is configured to generate a magnetic field MF to attract and collect the ferromagnetic or ferritic particles FP on the non-magnetic sleeve 32 that coalesce and come out of the hydronic fluid F, e.g., as shown in FIG. 8. The removable magnetic insert 34 is also configured to be removed from inside the non-magnetic sleeve 32 to release the ferromagnetic or ferritic particles FP attracted and collected on the non-magnetic sleeve 32 so that released ferromagnetic or ferritic particles FP can fall to the bottom portion 16 of the separation chamber 12, e.g., into a well assembly W as described below.

The Magnetic Separation Insert

Consistent with that shown in FIGS. 1, 4 and 5, the separation device 10 may include a bottom coupling member 16*a* configured on the bottom portion 16 of the separation device 10; and the non-magnetic sleeve 32 may include a sleeve coupling member 32*a* configured to couple to the bottom coupling member 14*a* for coupling the magnetic separation insert 30 to the bottom portion 16 of the separation device 10, including where an O-ring or sealing gasket 32*b* is arranged inbetween the coupling members 14*a*, 32*a*. By way of further example, and consistent with that set forth herein, embodiments are envisioned, and the scope of the invention is intended to include, e.g., implementations where the non-magnetic sleeve 32 of the magnetic separation insert 30 is coupled to the bottom portion 16 of the separation device 10 via welding; or where the non-magnetic sleeve 32 of the magnetic separation insert 30 and the bottom portion 16 of the separation device 10 are formed and coupled together as an integral unit, or where the sleeve coupling member 32*a* is detachably coupled to the bottom coupling member 14*a* via a friction fit for coupling the magnetic separation insert 30 to the bottom portion 16 of the separation device 10. In either case, the removable magnetic insert 34 may be configured to be removed from inside the non-magnetic sleeve 32 to release the ferromagnetic or ferritic particles FP attracted and collected on the non-magnetic sleeve 32 so that released ferromagnetic or ferritic particles FP can fall to the bottom portion 16 of the separation chamber 12, e.g., into the well assembly W as described below.

The non-magnetic sleeve 32 may include a non-magnetic surface 32*c* configured to collect the ferromagnetic or ferritic particles FP attracted to the removable magnet insert 34 by the magnetic field MF.

Consistent with that shown in FIG. 5, the removable magnet insert 34 may include a handle portion 34*a* having an insert coupling member 34*b*; and the sleeve coupling member 32*a* may be configured to receive the insert coupling member 34*b* and couple the removable magnet insert 34 to the non-magnetic sleeve 32 when the removable magnet insert 34 is inserted into the non-magnetic sleeve 32, including where an O-ring or sealing gasket is arranged inbetween the coupling members 32*a*, 34*b*. By way of example, and consistent with that set forth herein, embodiments are envisioned, and the scope of the invention is intended to include, e.g., implementations where the sleeve coupling member 32*a* may be configured to receive the insert coupling member 34*b* via a friction fit in order to couple the removable magnet insert 34 to the non-magnetic sleeve 32, as well as by using other detachably coupling techniques either now known or later developed in the future for removably coupling together the sleeve coupling member 32*a* and the insert coupling member 34*b*.

The removable magnet insert 34 may include a rod 34*c* connected to the handle 34*a*; and an alternating stack of magnets M and spacers S configured to slide onto the rod 34*c* and be retained by a bolt 34*d* fastened to an end of the rod 34*c*.

The alternating stack of magnets M may include opposite magnetic poles N, S arranged so that like magnetic poles (N, N; S, S) face each other and are separated by a respective spacer S, e.g., consistent with that shown in FIGS. 1 and 4-5.

The non-magnetic insert 32 may be made of stainless steel; and the spacers S may be made of carbon steel.

The Vertically Assembled Perforated Sheets

The vertically assembled perforated sheets 22 (FIGS. 3 and 9A, 9B) may be made from stainless steel.

The vertically assembled perforated sheets 22 may have a vertical diamond shape with angled edges like E1 (FIG. 2) configured to direct the hydronic fluid F to pass from an inlet I, through the coalescing media 20 and into the coalescing media interior space 22*c*, and having reverse angled edges like E2 (FIG. 2) configured to direct the hydronic fluid F to pass from the coalescing media interior space 22*c* to an outlet O or a discharge nozzle, leave the separation chamber 10 and allow a pressure drop to recover, e.g., as shown in FIG. 2. In FIG. 1, the inlet I and outlet O are retained by union end connections.

The vertically assembled perforated sheets 22 may be configured as corrugated sheets (FIG. 9A, 9B) having peaks 22*d*, crests 22*e* and surfaces 22*f* inbetween.

The vertically assembled perforated sheets 22 may be formed and assembled either from a single sheet having two ends that join to form a diamond shape, e.g., consistent with that shown in FIG. 3; or from multiple sheets having corresponding ends that join to form the diamond shape, e.g., consistent with that shown in FIGS. 9A, 9B.

The coalescing media interior space 22*c* may be formed as an open space, e.g., that is 58% or greater than the volume of the separator chamber 18 in order to improve pressure drop characteristics of the separation device 10.

The Maintenance Indicator

Consistent with that shown in FIGS. 2 and 6-7, the separation device 10 may include a maintenance indicator S configured on the outside of the separation device 10 to respond to a magnetic flux generated by the magnetic separation insert 30 and provide maintenance indicator signaling containing information about maintenance being needed on the separation device 10, including where the maintenance indicator signaling includes audio and/or visual signaling.

The maintenance indicator S may be configured to respond to a reduced magnetic flux when the released ferromagnetic or ferritic particles are removed from the bottom portion 16 of the separation chamber 18, as described below, and provide a corresponding maintenance indicator signaling that contains information that maintenance is not needed, e.g., by changing colors, turning off, stop beeping, etc.

The maintenance indicator S may include a circuit like that shown in FIGS. 6-7 having a magnetic sensor configured to respond to the magnetic flux. The magnetic sensor may include a Reed Switch (FIG. 6) or a Hall Effect sensor (FIG. 7). By way of example, the circuit in FIG. 6 includes the Reed Switch, a resistor, an LED and power source arranged in series. By way of further example, the circuit in FIG. 7 includes the Hall Effect sensor and a power source arranged in parallel with a resistance and LED combination.

Each circuit may include the light (e.g., LED) configured to provide visual maintenance indicator signaling, including where the light or LED turns ON/OFF, blinks or changes color.

The magnetic sensor may be configured to respond to the magnetic flux that exceeds a desired magnetic flux threshold. The desired magnetic threshold may depend and be based upon the amount of ferromagnetic or ferritic particles attracted and collected onto the non-magnetic sleeve.

Other Features of the Separation Device

The separation device 10 may include a well assembly W at the bottom portion 16 of the separation chamber 10 configured and shaped to collect the released ferromagnetic or ferritic particles.

The separation device may include a chamber or retaining head at the top portion 14 and a support or retaining ledge at the bottom portion 16 configured to retain fixedly the coalescing media 20 in the separation chamber 10, e.g., so it does not move, rotate, etc.

The separation device 10 may include or take the form of a residential hydronic magnetic, sediment and air separation device, e.g., that may be used residentially, and that may include a separator tank having a separator input I or inlet nozzle configured to receive the hydronic fluid F, having the tank wall 12 configured to form a volume/chamber inside the separator chamber 18 to process the hydronic fluid F, and having a separator output O or discharge nozzle configured to provide processed fluid, e.g., consistent with that shown in FIGS. 1-2

FIG. 9A, 9B: Vertically Aligned Corrugated Perforated Sheets

FIGS. 9A and 9B show the vertically aligned corrugated perforated sheets 22 in the form of vertically aligned corrugated perforated sheets that may have peaks 22*d*, crests 22*e* and surfaces 22*f* inbetween, and may be assembled to each other where a peak 22*d* of one corrugation is assembled to a crest 22*e* of another corrugation. Alternatively, the series of vertically aligned corrugated perforated sheets 22 having the peaks 22*d* and crests 22*e* may be assembled to each other peak-to-peak and crest-to-crest. In other words, the scope of the invention is not intended to be limited to any particular alignment of peaks and crests of the vertically aligned corrugated perforated sheets 22. In FIGS. 9A and 9B, each vertically aligned corrugated perforated sheet 22 has three (3) peaks 22*d*, four (4) crests 22*e* and six (6) surfaces 22*f* inbetween. (The terms "peaks" and "crests" may be used interchangeably within the spirit of the invention.)

The Vertically Aligned Perforated Sheets

The series of vertically aligned corrugated perforated sheets 22 may have multiple openings or perforations 22*b* that provide multiple surfaces for dissolved gasses and solids or particles to coalesce around. By way of example, and consistent with that shown in FIGS. 9A, 9B, the multiple openings or perforations 22*b* may be circular openings or perforations and the multiple surfaces may be circular or cylindrical surfaces, e.g., so as to be uniformly configured on the vertically aligned corrugated perforated sheets 32. However, the scope of the invention is intended to include, and embodiments are envisioned that include, the multiple openings or perforations 22*b* and the multiple surfaces having different types or kinds of shapes and surfaces within the spirit of the underlying invention, e.g., including a triangular shape and surface, a rectangular shape and surface, a square shape and surface, a hexagon shape and surface, etc. In other words, the scope of the invention is not intended to be limited to the shape of the opening or perforation 22*b* and its associated surface. For example, in one type of application the multiple openings or perforations 34 may have one shape and surface, while in another application, the multiple openings or perforations 22*b* may have another shape and surface, as one skilled in the art would appreciate.

Moreover, and by way of further example, and consistent with that shown in FIGS. 9A, 9B, the multiple openings or perforations 22*b* may be configured or dimensioned having the same size, e.g., so as to be uniformly distributed on the vertically aligned corrugated perforated sheets 22. However, the scope of the invention is intended to include, and embodiments are envisioned that include, the multiple openings or perforations 22*b* having different sizes within the spirit of the underlying invention. Moreover, the scope of the invention is not intended to be limited to the size of the multiple openings or perforations 22*b*, e.g., which may be configured or dimensioned with a particular size based upon a particular application as one skilled in the would appreciate. For example, in one type of application the multiple openings or perforations 22*b* may have one size or dimension, while in another application, the multiple openings or perforations 22*b* may have another and different size or dimension.

Moreover still, and by way of still further example, and consistent with that shown in FIGS. 9A, 9B, the multiple openings or perforations 22*b* may be configured, dimensioned or spaced in relation to one another having the same distance inbetween, e.g., so as to be uniformly distributed on the vertically aligned corrugated perforated sheets 22. However, the scope of the invention is intended to include, and embodiments are envisioned that include, the multiple openings or perforations 22*b* having different distances inbetween within the spirit of the underlying invention. Moreover, the scope of the invention is not intended to be limited to any particular distances inbetween the multiple openings or perforations 22*b*, e.g., which may be configured or dimensioned with a particular distance inbetween based upon a particular application as one skilled in the would appreciate. For example, in one type of application the multiple openings or perforations 22*b* may have one distance inbetween, while in another application, the multiple openings or perforations 22*b* may have another and different distance inbetween.

The series of vertically aligned corrugated perforated sheets 22 may have angled corrugations that direct the fluid to pass through the coalescing media 20 where greatest surface contact occurs. By way of example, and consistent with that shown in FIGS. 9A and 9B, the vertically aligned corrugated perforated sheets 22 have angled corrugations with a 90° angle (i.e. right angle). As the fluid has completed its pass through the coalescing media 20, the angled corrugations may direct the fluid to the separator output O to leave the coalescing removal separator 10 and allow a pressure drop to recover. However, the scope of the invention is intended to include, and embodiments are envisioned that include, the angled corrugations having a different angle within the spirit of the underlying invention. For example, the scope of the invention is intended to include, and embodiments are envisioned that include, the angled corrugations being more or less than 90°, e.g., so as to be configured or dimensioned with a particular angled corrugation based upon a particular application as one skilled in the would appreciate. For example, in one type of application the angled corrugation may have one angle, while in another application, the angled corrugation may have another and different angle.

The Assignee's Other Related Technology

This application also relates to patent application Ser. No. 17/204,141, filed 17 May 2021, as well as patent application Ser. No. 17/518,698, filed 4 Nov. 2021, which are both assigned to the assignee of the instant application, and which are both hereby incorporated by reference in their entirety.

THE SCOPE OF THE INVENTION

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A separation device including a tank wall having a top portion with an inlet and outlet, and also having a bottom portion that combines with the top portion to form a separation chamber for processing a hydronic fluid, comprising:

a coalescing media arranged between the inlet and the outlet of the top portion, and including vertically assembled perforated sheets having surfaces with a multiplicity of openings, the vertically assembled perforated sheets configured to form a coalescing media interior space in the separation chamber, the vertically assembled perforated sheets having a vertical diamond shape with two angled edges, including an angled edge arranged at the inlet and configured to direct the hydronic fluid to pass through the coalescing media and into the coalescing media interior space and also configured and shaped to slow down the hydronic fluid flowing in the inlet and through the coalescing media interior space and enable entrained gasses, ferromagnetic or ferritic particles and other solids to coalesce and come out of the hydronic fluid via a coalescing action caused by the hydronic fluid contacting and flowing through the coalescing media to the outlet, and also including a reverse angled edge arranged at the outlet and configured to direct the hydronic fluid to pass from the coalescing media interior space to the outlet or a discharge nozzle of the separation device, leave the separation chamber and allow a pressure drop to recover; and a magnetic separation insert coupled to the bottom portion of the separation device and arranged in the coalescing media interior space in the top portion, having a non-magnetic sleeve that surrounds a removable magnet insert, the removable magnet insert configured to generate a magnetic field to attract and collect the ferromagnetic or ferritic particles on the non-magnetic sleeve that coalesce and come out of the hydronic fluid, and also configured to be removed from inside the non-magnetic sleeve to release the ferromagnetic or ferritic particles attracted and collected on the non-magnetic sleeve so that released ferromagnetic or ferritic particles fall to the bottom portion of the separation chamber.

2. The separation device according to claim 1, wherein the separation device comprises a bottom coupling member configured on the bottom portion of the separation device; and the non-magnetic sleeve comprises a sleeve coupling member configured to detachably couple to the bottom coupling member for coupling the magnetic separation insert to the bottom portion of the separation device.

3. The separation device according to claim 2, wherein the non-magnetic sleeve comprises a non-magnetic surface configured to collected the ferromagnetic or ferritic particles attracted to the removable magnet insert by the magnetic field.

4. The separation device according to claim 2, wherein the removable magnet insert comprises a handle having an insert coupling member; and the sleeve coupling member is configured to receive the insert coupling member and couple the removable magnet insert to the non-magnetic sleeve when the removable magnet insert is inserted into the non-magnetic sleeve.

5. The separation device according to claim 4, wherein the removable magnet insert comprises a rod connected to the handle; and an alternating stack of magnets and spacers configured to slide onto the rod and be retained by a bolt fastened to an end of the rod.

6. The separation device according to claim 5, wherein the alternating stack of magnets comprise opposite magnetic poles arranged so that like magnetic poles face each other and are separated by a spacer.

7. The separation device according to claim 5, wherein the non-magnetic insert is made of stainless steel; or the spacers are made of carbon steel; or the non-magnetic insert is made of stainless steel and the spacers are made of carbon steel.

8. The separation device according to claim 1, wherein the vertically assembled perforated sheets are made from stainless steel.

9. The separation device according to claim 1, wherein the vertically assembled perforated sheets have four angled edges, including the angled edge, the reverse angled edge and two intermediate angled edges configured between the angled edge and the reverse angled edge.

10. The separation device according to claim 1, wherein the vertically assembled perforated sheets are configured as corrugated sheets having peaks, crests and surfaces between the peaks and crests.

11. The separation device according to claim 10, wherein the vertically assembled perforated sheets are formed and assembled either from a single sheet having two ends that join to form a diamond shape, or from multiple sheets having corresponding ends that join to form the diamond shape.

12. The separation device according to claim 1, wherein the coalescing media interior space is an open space that is 58% or greater than the volume of the separation chamber in order to improve pressure drop characteristics of the separation device.

13. The separation device according to claim 1, wherein the separation device includes a well assembly at the bottom portion of the separation chamber configured to collect the released ferromagnetic or ferritic particles.

14. The separation device according to claim 1, wherein the separation device comprises a maintenance indicator configured to respond to a magnetic flux generated by the magnetic separation insert and provide maintenance indicator signaling containing information about maintenance being needed on the separation device, including where the maintenance indicator signaling includes audio and/or visual signaling.

15. The separation device according to claim 14, wherein the maintenance indicator is configured to respond to a reduced magnetic flux when the released ferromagnetic or ferritic particles are removed from the bottom portion of the separation chamber, and provide a corresponding maintenance indicator signaling that contains information that maintenance is not needed.

16. The separation device according to claim 14, wherein the maintenance indicator comprises a circuit having a magnetic sensor configured to respond to the magnetic flux.

17. The separation device according to claim 16, wherein the magnetic sensor comprises a Reed Switch or a Hall Effect sensor.

18. The separation device according to claim 16, wherein the circuit comprises a light configured to provide visual maintenance indicator signaling, including where the light turns ON/OFF, blinks or changes color.

19. The separation device according to claim 16, wherein the magnetic sensor is configured to respond to the magnetic flux that exceeds a desired magnetic flux threshold.

20. The separation device according to claim 19, wherein the desired magnetic threshold depends and is based upon the amount of ferromagnetic or ferritic particles attracted and collected onto the non-magnetic sleeve.

21. The separation device according to claim 1, wherein the separation device comprises a residential hydronic magnetic, sediment and air separation device that includes:

a separator tank having a separator input or inlet nozzle configured to receive the hydronic fluid, having the tank wall configured to form a volume/chamber inside the separator chamber to process the hydronic fluid, and having a separator output or discharge nozzle configured to provide processed hydronic fluid having at least some of the entrained gas, the ferromagnetic or ferritic particles and the other solid removed.

22. The separation device according to claim 1, wherein the separation device comprises a blow down valve configured at the bottom portion of the separation chamber to open and drain the released ferromagnetic or ferritic particles.

23. The separation device according to claim 1, wherein the separation device comprises an air vent configured at the top portion of the separation chamber to vent the entrained gasses that come out of the hydronic fluid.

24. The separation device according to claim 1, wherein the multiplicity of openings formed in the surfaces of the vertically assembled perforated sheets also coalesce the gasses and the other solids in the hydronic fluid.

* * * * *